May 19, 1925.

J. L. SMITH

DEVICE FOR REMOVING SCALE AND SURFACE DEFECTS
FROM STEEL WHILE BEING ROLLED HOT

Filed May 25, 1923

INVENTOR
John L. Smith.
BY
Albert E Dieterich
ATTORNEY

May 19, 1925.  1,538,304
J. L. SMITH
DEVICE FOR REMOVING SCALE AND SURFACE DEFECTS
FROM STEEL WHILE BEING ROLLED HOT
Filed May 25, 1923  7 Sheets-Sheet 2

INVENTOR
John L. Smith.
BY
Albert E Dieterich
ATTORNEY

Patented May 19, 1925.

1,538,304

UNITED STATES PATENT OFFICE.

JOHN L. SMITH, OF HAMILTON, ONTARIO, CANADA.

DEVICE FOR REMOVING SCALE AND SURFACE DEFECTS FROM STEEL WHILE BEING ROLLED HOT.

Application filed May 25, 1923. Serial No. 641,453.

*To all whom it may concern:*

Be it known that I, JOHN L. SMITH, a citizen of the Dominion of Canada, residing at Hamilton, in the Province of Ontario, Dominion of Canada, have invented certain new and useful Improvements in Devices for Removing Scale and Surface Defects from Steel While Being Rolled Hot, of which the following is a specification.

The invention resides in the provision of apparatus for removing surface defects from steel while being rolled hot, more especially flat rolled material including channels, and I beams.

The present invention also has for an object to provide an apparatus which may be used in removing scale and surface defects from sheet bar; this scale, unless removed, will be rolled into the sheet and the scale so rolled into the sheet is during the pickling process, removed with the result that the sheet will be left pitted and in a defective condition.

It is the object of this invention, to provide a simple and effective means for removing the surface defects from such steel being rolled, and the invention particularly is directed to the removal of defects from that particular class of rolled product known as flat material and the invention is sufficiently comprehensive to cover all flat rolled material, including channels, I beams, and in a manner whereby any of the flats, of the various types which may be acted upon by my invention, may later be worked upon to produce finished articles free of all scale and surface defects.

The invention more particularly has for its object to provide a means whereby the product is effectively guided in its course into and out of the defect removing mechanisms, by removable bell mouths, to be acted upon by suitable defect removing knives, each set cooperative with the other in a manner for effectively removing such defects, and capable of being moved in relation to each other for permitting the introduction of the rolled product and also of being readily removed from the supporting housing thereof for repair or replacement.

The invention further has for its object to provide suitable defect removing knives, readily removably mounted within a housing, means for guiding the incoming product over the knives, and means for moving the knives into cooperative relation with each other and the moving product.

With the above and other objects in view that will hereinafter appear the invention resides in those novel details of construction, combination and arrangement of parts, all of which will be first fully described, then be specifically pointed out in the appended claims and illustrated in the accompanying drawings, in which:

Figures 14 and 15 are face and side elevations respectively of an upper knife carrying plate member.

Figure 18 is a plan view of the member shown in Figure 17.

Figure 28 is a detail cross section of the removable bottom plate.

Figures 2, 4, 5, 6:
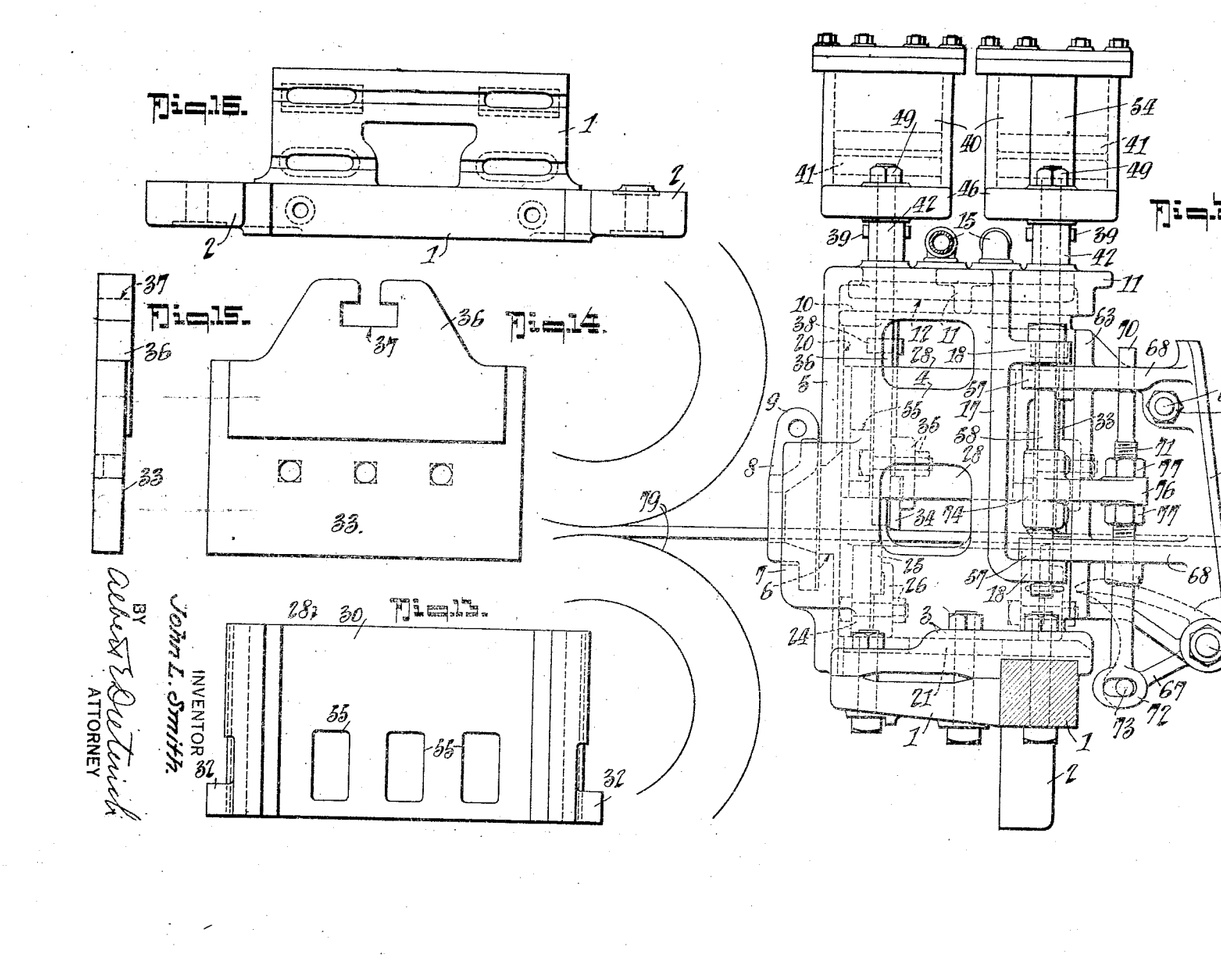
Figure 2 is a side elevation of the parts shown in Figure 1, a portion of the flat product being shown as passing through the apparatus and as being worked upon by a set of rolls.
Figure 4 is a vertical longitudinal section taken substantially on the line 4—4 on Figure 3.
Figure 5 is a view illustrating diagrammatically the layout of a portion of a rolling mill showing the bed upon which the rolling stands are mounted in series and illustrating a single rolling stand with my invention cooperatively mounted thereupon.
Figure 6 is a rear face view of the main housing.
Figures 2B, 4:
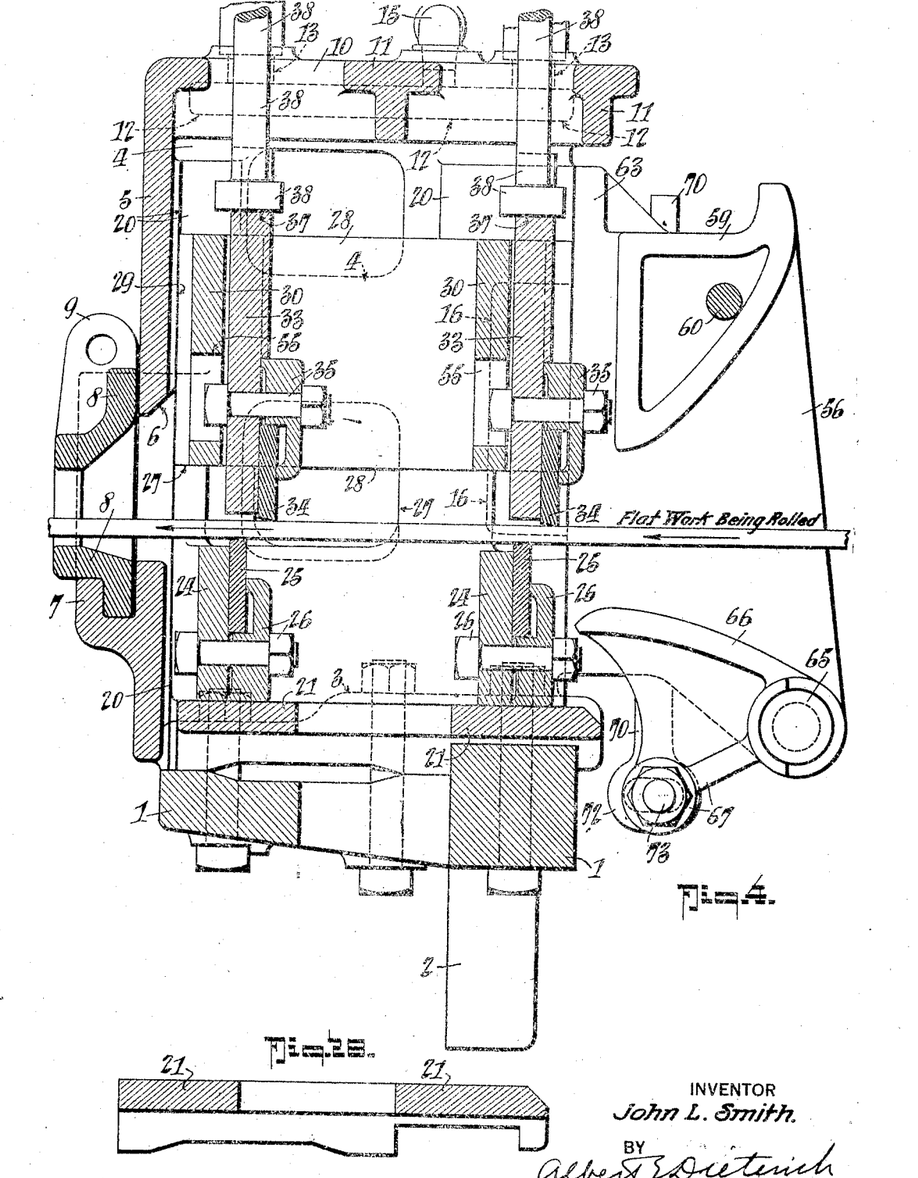

In the practical embodiment of my invention I provide a base bracket 1 provided with side ears 2 adapted to be secured to the rolling stand as is diagrammatically illustrated in Figure 5.

The base bracket 1 has a rearwardly extending portion to which is secured the side flanges 3 of the main housing which includes side walls 4 and a rear wall 5 provided with an opening 6 surrounded on three sides by a guide flange 7 for accommodating, removably, a bell mouth member 8 which includes an apertured ear 9 for facilitating the removal thereof when desired.

At each side of its upper portion, the main housing includes a pair of side casing portions 10, joined to form an open top by cross webs 11. Each of the casing portions 10 includes a longitudinal duct 12, each separate and independent of the other, a pair of threaded taps 13 and a single threaded tap 14. The threaded taps 13 are in cross alignment with each other while the single threaded apertures 14 are in staggered relation. The latter are each adapted to receive an air or fluid pipe 15 in a manner and for the purpose later to be described.

The main housing also includes cutout portions 16 in the fore-portions of the opposite sides thereof, vertical strengthening webs 17, horizontal webs 18 merging therewith and apertured as at 19, and inwardly projecting machined faces 20, the purpose of all of which will presently appear.

Figures 5, 6, 7:
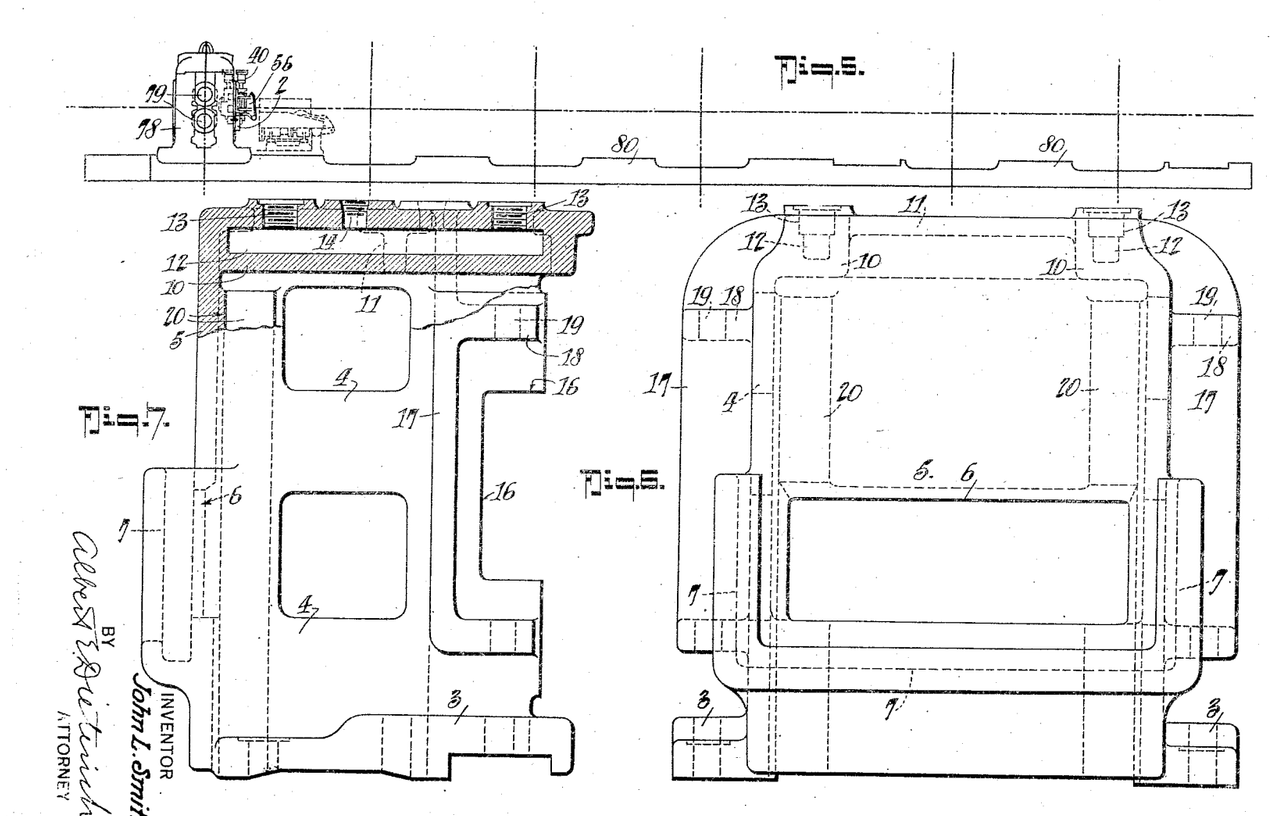
Figure 7 is a side elevation thereof, parts being in longitudinal section.
Figures 8, 9, 10, 11, 12, 13:
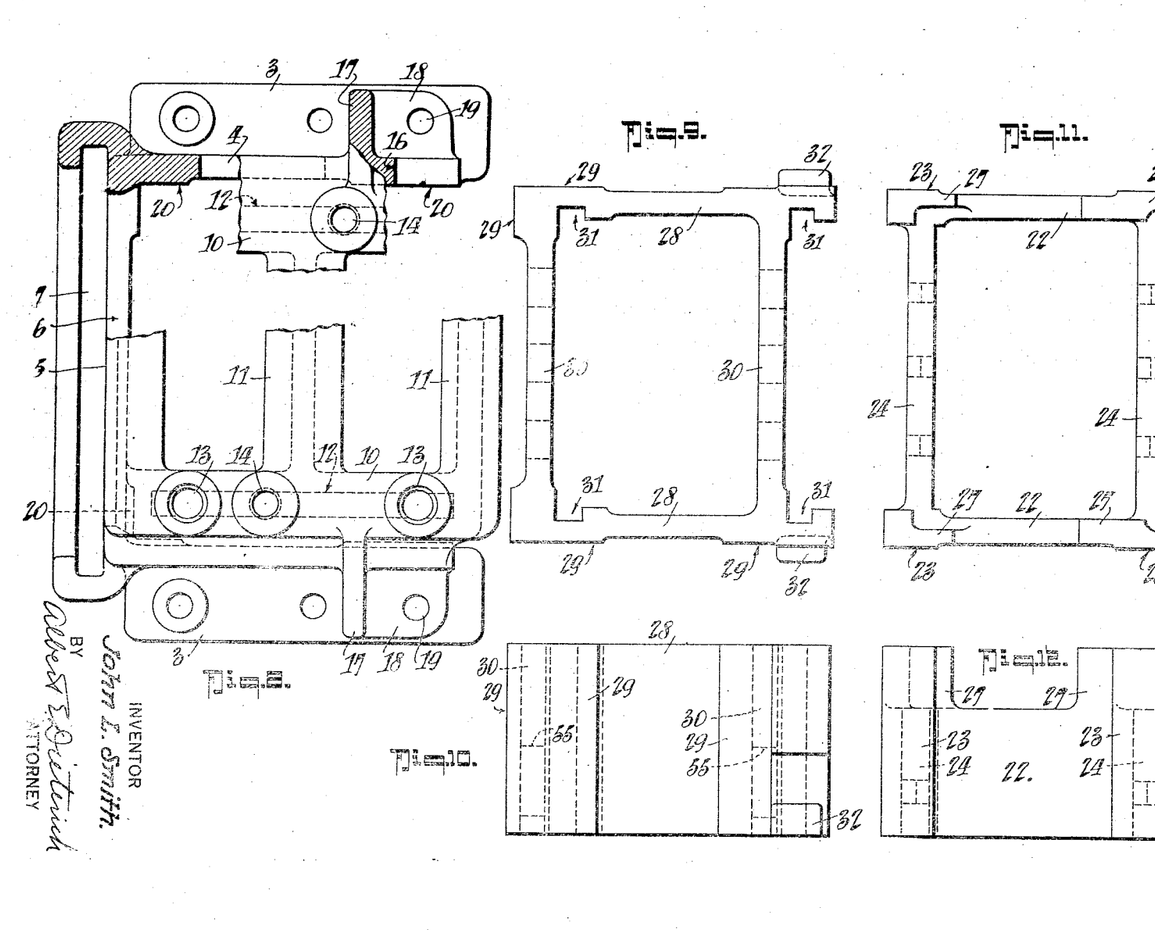
Figure 8 is a plan view of the housing, parts being broken away and in horizontal section.
Figures 9 and 10 are plan and side elevations of the upper knife guiding member.
Figures 11 and 12 are plan and side elevations of the lower knife carrying member.
Figure 13 is a front elevation of the upper knife guiding member.

It will be observed, by reference to Figures 6, 7 and 8, that the housing includes a top portion, side portions and a rear wall but is entirely open at its front and bottom.

Resting upon the rearward projections of the base bracket 1 and within the confines of the housing, I provide a removable bottom member 21, see Figures 2 and 28, which forms a suitable removable floor for the housing.

In the embodiment of my invention shown in the drawings I provide a lower pair of stationary knives over which the product is adapted to move, and a movable pair of upper knives adapted to engage the upper surface of the product, and, for properly supporting, guiding and operating these knives in proper relation for effecting the desired removal of the surface defects from the product being rolled, I provide a lower knife carrying member 22 adapted to rest upon the removable bottom member 21, which said member includes outward projections with machined faces 23, cross bars 24 to which the knives 25 are fixedly secured by bolt and clamp means 26, and vertically projecting portions 27 upon which the knife guiding member 28 is adapted to rest in a manner hereinafter explained, see Figures 2, 4 and 12.

The upper knife guiding member 28 also includes projections and machined faces 29, cross bars 30, vertical guideways 31 and lateral projecting lugs 32, the purpose for all of which will soon appear.

Cooperative with the vertical guideways 31 and cross bars 30 of the upper knife guiding member 28, are a pair of knife carrying blades 33 to which the upper knives 34 are secured by clamp and bolt connections 35. The knife carrying blades also each include an upward projection 36 provided with a cutout portion or socket 37 adapted to accommodate the head of an operating rod 38 extending vertically from the socket 37 upward through the top of the housing, and through the gland 39 of the respective operating cylinder 40 to be actuated by the piston 41 to which it is secured and which operates vertically within the cylinder 40.

Figures 1, 16, 17:
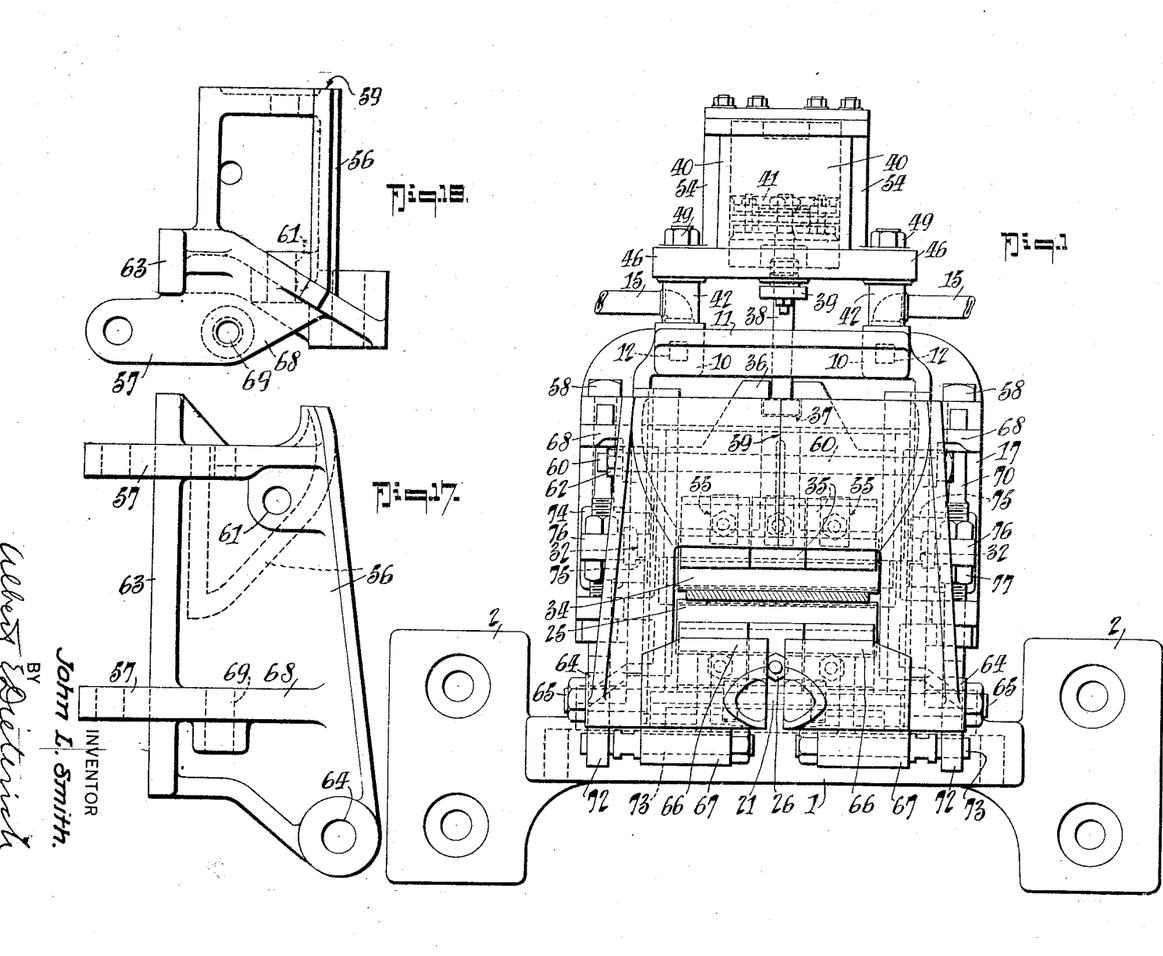
Figure 1 is a front elevation of my improved defect removing apparatus, removed from the rolling stand; a bar being shown in position in section.
Figure 16 is a plan view of the housing supporting base.
Figure 17 is a side elevation of one of the pivoted bell mouth forming members.
Figures 19, 20, 21, 22, 23, 24, 25, 26, 27:
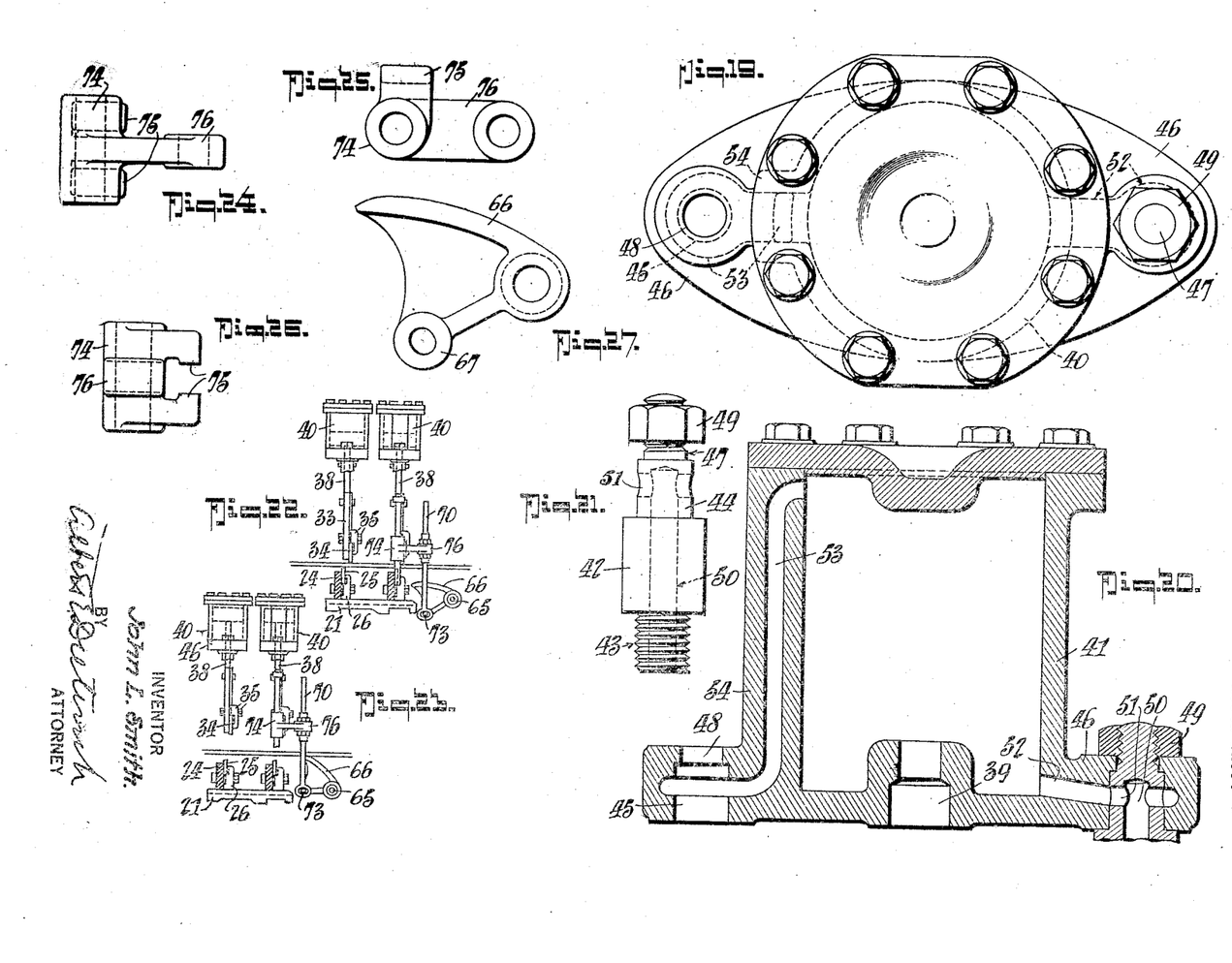
Figure 19 is a plan view of one of the cylinders.
Figure 20 is a central longitudinal section of one of the cylinders, a portion of one of the supporting posts being also shown.
Figure 21 is a detail view of one of the cylinder supporting posts.
Figure 22 is a diagrammatic view illustrating the position of the parts during the scraping or defect removing action.
Figure 23 is a diagrammatic view illustrating the position of the parts as the product enters my apparatus and before the knives have been set to the scraping or defect removing position.
Figure 24 is a side elevation of the apron actuating head.
Figure 25 is a plan view of the apron actuating head.
Figure 26 is a front elevation of the apron actuating head.
Figure 27 is a side elevation of one of the apron members.

Each of the cylinders 40 are supported above the housing upon posts 42, each of which includes a reduced and threaded end 43 adapted to be secured into the threaded taps 13 of each housing side, a reduced upper end 44 adapted to fit into the socket 45 formed in each of the lateral foot extensions of each cylinder 40, and a further reduced and threaded portion 47 adapted to pass through the reduced aperture 48 in the said foot portions 46 to receive a securing nut 49, see Figures 1, 20 and 21.

Each of the posts 42, shown in detail in Figure 21, also includes a vertical duct 50, adapted to communicate with the respective longitudinal duct 12 of the housing side, and a lateral duct 51 adapted to communicate with either the air duct 52 of one of the foot portions 46 which communicates with the bottom of the cylinder or the duct 53 of the other of such foot portions which communicates, through the enlargement 54, with the top portion of the cylinder, see Figure 20.

As will later appear the upper set of the knives 34 are adapted to be moved toward or from the product being rolled in a vertical direction and means is provided for causing the vertically moving knives to effect a raising and lowering of the upper knife guiding member for a purpose later to be described. To accomplish this I provide the cross bars 30 of the guiding member with a plurality, one for each clamp bolt, of vertical slotways 55 which allow a certain amount of vertical movement of the knives 34 without effecting vertical movement of the guiding member but which are of such length as to cause a lifting of said guiding member during a portion of the upward movement of said knife.

Figure 3:
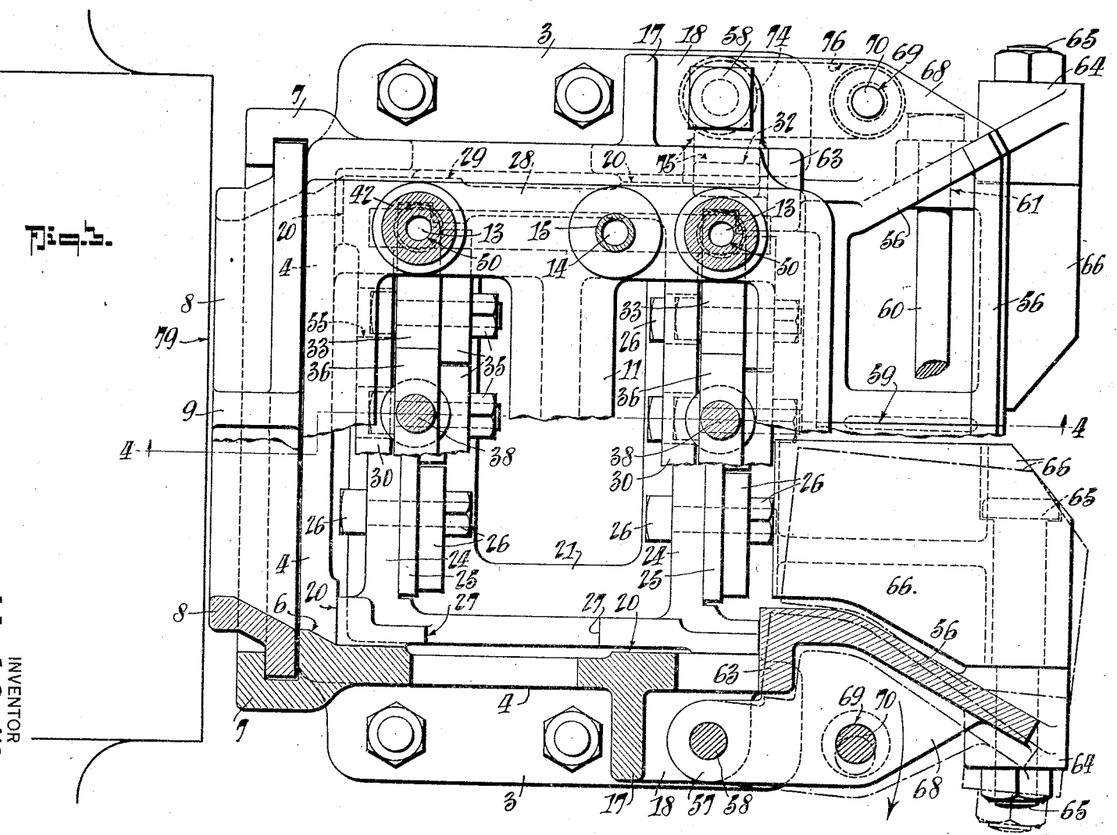
Figure 3 is a plan view and part horizontal section, that portion shown in plan being taken just below the cylinders, and that portion shown in horizontal section being taken at approximately the working center line of the rolls.

At the front or entrant end of the housing I provide a pair of cooperating bell mouth members 56, each of which includes pivoting ears 57 having apertures registering with those 19 in the webs 18 of the main housing and which, when the ears 57 and the webs 18 are cooperatively connected by the pivot pin 58, make it possible to swing the individual bell mouth members outward to wholly open the front of the housing, see arrow and dot and dash lines on Figure 3. When the bell mouth members 56 are at their operative position, as shown in Figures 1, 2 and 3, the edges 59 of each thereof abut at the central line and are clamped at such position by the cross or clamp rod 60 which takes through the upper rod bearing apertures 61 (see Figure 17) provided therefor in the said members 56 and the said clamp rod is securely held to this normal position by the clamp nut 62.

By reference to Figures 2, 3, and 4 it will be observed that, in the operative condition of my apparatus, the lower knife carrying member 22 rests upon the removable floor 21 with its projected and machined faces 23 engaging, in close but movable fit, the inwardly projecting and machined faces 20 of the housing. The upper knife guiding member similarly fits within the housing with its outwardly projecting machined faces 29 engaging the faces 20 of the housing, and resting upon the said lower knife carrying member. It will be observed, especially from Figure 3, that the fore-portions of the upper knife guiding member 28 and the lower knife carrying member 22 project to a point on a plane with the front open face of the housing. For properly holding, in a removable manner, the said members 22 and 28 in operative relation within the housing, I provide each bell mouth member 56 with a heel portion 63 which, when the said bell mouth members are in their operative position shown in full lines in Figure 3, effectively serves to form abutments past which the said member may not be withdrawn except when the cross or clamp rod 60 is removed and each of the opposing bell mouth members swung to the open position in the manner indicated in dot and dash lines in the said Figure 3.

Each of the bell mouth members 56 also includes a lower apertured bearing hub 64 which cooperates with the stud pivot 65 in pivotally supporting the apron member 66, which said apron member includes a crank portion 67.

The ears 57 of each of the bell mouth members 56 are extended to form ears 68, apertured as at 69, to receive, in a vertically movable manner, an actuating rod 70 which includes a threaded portion 71 and an apertured head at the lower end thereof adapted to accommodate the cross pin 73 fixed to the crank portion 67 of each apron.

As hereinbefore described the bottom knife members are stationary while the upper set of knife members are moved toward or from the said bottom members to effect the scraping or surface defect removing operation or the cessation of the said operation as the case may be. Inasmuch as the bottom set of knives effect their surface defect removing result by reason of the product passing thereover, means must be provided at the outset of the operation for lifting or directing the incoming end of the product over said knives and for this purpose I provide the apron members 66. When the device is in its normal or operating position the aprons are dropped down to the position shown in Figure 4 and as diagrammatically shown in Figure 22, but when the product is first entering the device to pass therethrough the apron members are lifted to the position diagrammatically illustrated in Figure 23 to cause the said fast moving product to be directed freely over the bottom knives.

In order to effect this raising and lowering of the apron members I provide, slidably mounted on the pivot pin 58, an apron actuating head 74 which includes lateral fingers 75 which engage, to be moved by and with, the lugs 32 of the knife guiding member 28 which projects laterally through the cut-away portions 16 of the housing side walls 4, and which also include a single forwardly projecting finger 76 secured upon the threaded portions 71 of the rod 70 by clamp nuts 77, see Figures 1, 2, 24 and 26.

By thus mounting the apron members 66 they are caused to move upwardly into the path of the travelling product by the upward movement of the pistons within the cylinders 40.

In Figure 5 is diagrammatically illustrated a lay-out of a series of rolling stands. In this figure the horizontal dot and dash lines indicate the line of travel of the product while the vertical dot and dash lines indicate the positions of the individual sets of rolling stands in their proper successive relation upon the carrying bed. In this figure a single set of rolls mounted on their rolling stand is illustrated in detail with my apparatus cooperatively mounted thereupon, and from this figure it will be observed that the clamping ears 2 of the bracket 1 are secured to the casing 78 of the rolling stand, the rolls themselves being indicated at 79 and the bed frame at 80.

While, in Figure 1, and in the rest of the drawings I have illustrated the invention, particularly the knife blades, as adaptable to operate on flat bar rolled product it should be readily understood that by merely changing the shape of my cutting knives the invention may be adapted to various specific shapes of rolled product and I do not desire to be limited to the specific shape shown. It is further just as obvious that the arrangement and number of cylinders and their cooperative relation with the housing, the apron members, and the knife blades may be varied in various manners within the scope of the invention pointed out in the appended claims.

Assuming the parts to be in the position diagrammatically illustrated in Figure 23, that is, with the pistons actuated to their uppermost limit under action of the fluid pressure through the respective pipe 15, the respective duct 12, the respective ducts 50, 51 and 52, the upper set of knives will have been moved to their uppermost position carrying with them, during the last portion of their movement, the upper knife guiding member 28 by reason of the action of the clamping bolts 35 in the vertical slotways 55 in said guiding member.

This lifting action of the guiding member 28 effects, through the action of the lugs 32, the fingers 75, head 72, finger 76 and rod 70, the lifting of the apron members to a position for causing the product being rolled to pass freely over the bottom stationary knives.

On the reversal of this action, that is, forcing down of the pistons 41 within the cylinders 40 under action of fluid pressure through the respective pipe 15, duct 12, ducts 50, 51 and 53, the knives will be forced downward into scraping relation with the product passing through the apparatus and, simultaneously with the start of such downward movement, replace the aprons to their lowered positions allowing the product being rolled to rest upon and drag over the bottom set of defect removing knife members, see Figure 2.

By reason of constructing the various parts of my invention as hereinbefore described it will be readily understood that the rear bell mouth member may be readily removed for repair or replacement, that the knives may be readily removed for sharpening, repair or replacement, the apron and front bell mouth units may be readily replaced and, by reason of hingedly mounting the said bell mouth members in cooperation with the open front face of the housing it is readily apparent that the upper and lower sets of knives and their cooperating carrying members and guiding members may be withdrawn bodily through the open front of the housing for repair, replacement, or the cleaning out of any chips or minute particles of material which may collect within the housing if such should occur.

By reason of the head and notch connections between the vertical knife actuating rod 38 and the upward extension 36 of the knife carrying plates such bodily withdrawal of the knife guiding member is made possible.

From the foregoing description, taken in connection with the drawings, the novel details of construction, the manner of operation and the advantages of my invention will be readily apparent to those skilled in the art to which it appertains.

What I claim is:

1. An apparatus of the class described comprising a lower stationary scraping means consisting of a pair of scrapers spaced apart in the direction of movement of the work, an upper scraping means consisting of a corresponding pair of scraping elements associated with the lower scraping elements, means for moving the upper scraping elements toward and from the lower scraping elements and means operated by the upward movement of such upper scraping elements for raising the approaching work clear of the lower scraping elements whereby the advance end of the work will be prevented from engaging the lower scraper, thereby preventing cobbles forming in the bar.

2. An apparatus of the class described comprising a lower scraping means, an upper scraping means, means for moving said upper scraping means in cooperative relation with the said lower scraping means, and means for freeing the article being passed through the apparatus from the action of the scraping means at will.

3. An apparatus of the class described comprising an upper scraping element, a lower scraping element, means for bringing together and for separating said scraping elements in cooperative relation, and means for lifting the article being passed through the apparatus free of the action of the scraping elements when said elements are separated.

4. An apparatus of the class described comprising opposing surface scraping elements, apron members, and means for moving said elements toward or from each other in cooperative relation and for effecting a lifting of said apron members to free the article being passed through the apparatus from the scraping elements.

5. An apparatus of the class described comprising opposing surface scraping elements, apron members, and means for moving said elements with relation to each other and for effecting action of said apron members to permit free movement, between the scraping elements, of the article being passed through the apparatus simultaneously with the movement of the scraping elements.

6. An apparatus of the class described comprising a lower stationary set of surface scraping knives including horizontal cutting edges over which the article being passed through the apparatus is adapted to drag, an upper set of such knives vertically movable in cooperative relation with the lower knives, means for moving said movable knives, apron members adapted to lie beneath the plane of travel of the article being passed through the apparatus, and means operable simultaneously with the moving of the movable knives for lifting said apron members to engage and free the article being passed through the apparatus from scraping relation with the lower stationary knives.

7. An apparatus of the class described comprising a plurality of surface scraping elements, a housing for said elements which has an open front, means for mounting said housing on the frame of a rolling mill, means for supporting said scraping elements within said housing, said last named means being such as to permit ready removal thereof through the open front of the housing substantially as shown and described.

8. An apparatus of the class described comprising a plurality of surface scraping elements, a housing for said elements which has an open front, means for supporting said scraping elements, said last named means being such as to enable ready removal thereof through the open front of the said housing, and movable means for obstructing the ready removal of said supporting means.

9. An apparatus of the class described comprising a plurality of surface scraping elements, a housing for said elements which has an open front, means for supporting said scraping elements, said last named means being such as to enable ready removal thereof through the open front of the said housing, and front bell mouth forming elements including heel portions adapted to retain the said supporting means within the housing.

10. An apparatus of the class described comprising a plurality of surface scraping elements, a housing for said elements which has an open front, means for supporting said scraping elements said last named means being such as to enable ready removal thereof through the open front of the said housing, and front bell mouth forming elements including heel portions adapted to retain the said supporting means within the housing, means for hingedly mounting one such mouth forming element at each side of the open front of the housing, and means for clamping said elements together at the supporting-means-securing position.

11. An apparatus of the class described comprising a housing, a bracket supporting said housing, a bell mouth removably mounted upon said housing, and scraping elements within said housing.

12. An apparatus of the class described comprising a housing including an entrance and an exit, a bracket supporting said housing, a bell mouth removably mounted cooperative with the exit of said housing, scraping elements within said housing, and bell mouth forming members hingedly secured to said housing cooperative with the entrance thereof.

13. An apparatus of the class described comprising a housing including a rear wall having an exit, an open front and an open bottom, a bracket for supporting said housing, a removable floor supported by said bracket, a bell mouth removably mounted, cooperative with said exit, scraping elements within said housing, and bell mouth forming members hingedly mounted upon said housing cooperative with the open front thereof.

14. An apparatus of the class described comprising a housing including a rear wall having an exit, an open front and an open bottom, a bracket for supporting said housing, a removable floor supported by said bracket, a bell mouth removably mounted, cooperative with said exit, lower surface scraping elements within said housing, upper surface scraping elements within said housing, bell mouth forming members hingedly mounted upon said housing, apron members pivotally mounted upon said housing cooperative with the open front thereof, and means for raising and lowering the upper scraping elements and the apron members.

15. An apparatus of the class described comprising a housing having an open front and an opening at its rear, a lower scraper knife carrying member slidable through the open front of the housing, knife blades secured to said carrying member, an upper set of knife carrying plates, an upper knife supporting and guiding member adapted to support and guide the said carrying plates, and to rest upon the said lower knife carrying member and to be slidable through the said open front of the housing, means for moving the upper set of knives with relation to the lower knives, apron members adapted to normally lie in a plane beneath the line of travel of the article being passed through the apparatus, and means for lifting said apron members simultaneously with the full lifting action of said upper knives.

16. An apparatus of the class described comprising a lower stationary set of surface scraping knives including horizontal cutting edges over which the product being passed through the apparatus is adapted to drag, an upper set of such knives vertically movable in cooperative relation with the lower knives, means for moving said movable knives, apron members adapted to lie beneath the plane of travel of the product being passed through the apparatus, and means operable simultaneously with the moving of the movable knives for lifting said aprons to engage and free the article being passed through the apparatus from scraping relation with the lower stationary knives, and means for adjusting the degree of lift of said apron lifting means.

17. An apparatus of the class described comprising a housing including an entrance and an exit and a pair of opposite fluid ducts, a lower stationary set of scraper elements within said housing, an upper set of movable scraper elements within said housing, working cylinders supported upon said housing, pistons within said cylinders, piston rods secured to said pistons and removably secured to said movable scraper elements and means whereby fluid pressure is directed from a source of supply through one of the housing ducts into one portion of the working cylinders to force the pistons downwardly and whereby fluid pressure is directed from the other housing duct into another portion of said working cylinders to force the pistons upwardly.

18. An apparatus of the class described comprising a housing including an entrance and an exit and a pair of opposite fluid ducts, a lower stationary set of scraper elements within said housing, an upper set of movable scraper elements within said housing, working cylinders supported upon said housing, pistons within said cylinders, piston rods secured to said pistons and removably secured to said movable scraper elements and means whereby fluid pressure is directed from a source of supply through one of the housing ducts into one portion of the working cylinders to force the pistons downwardly and whereby fluid pressure is directed from the other housing duct into another portion of said working cylinders to force the pistons upwardly, apron members pivotally mounted cooperative with the entrance of said housing, and means actuated by the raising and lowering of the movable scraper elements for raising and lowering said aprons.

19. In apparatus of the class described, upper and lower scrapers between which the article being passed through the apparatus to be scraped is passed, scraper separating means and lifting means to lift the article over the lower scrapers out of contact therewith.

20. In apparatus of the class described, a fixed housing having a chamber with an entrant and exit passage, upper and lower knife carrying frames held within the housing chamber and insertable and withdrawable through the entrant passage thereof and means to secure said housing of the frame to a rolling mill.

21. In apparatus of the class described, a fixed housing having a chamber with an entrant and exit passage, upper and lower knife carrying frames held within the housing chamber and insertable and withdrawable through the entrant passage thereof, and means for operating the knives and means to secure said housing of the frame to a rolling mill.

22. In apparatus of the class described, a fixed housing having a chamber with an entrant and exit passage, upper and lower knife carrying frames held within the housing chamber and insertable and withdrawable through the entrant passage thereof, bell mouth members constituting an entrance to said entrant passage and means to secure said housing of the frame to a rolling mill.

23. In apparatus of the class described, a fixed housing having a chamber with an entrant and exit passage, upper and lower knife carrying frames held within the housing chamber and insertable and withdrawable through the entrant passage thereof, bell mouth members constituting an entrance to said entrant passage, means mounting said bell mouth members to retain said knife carrying frames in place and permit their removal at times.

24. In apparatus of the class described a fixed housing having a chamber with an entrant and exit passage, upper and lower knife carrying frames held within the housing chamber and insertable and withdrawable through the entrant passage thereof, means for operating the knives, and a raising mechanism cooperating with said knife operating means whereby when said knives are separated the approaching article will be raised over and be freed of the lower knives.

25. In apparatus of the class described, the combination with upper and lower scraper knives and means to raise and lower the upper knives, of a lifting apron to elevate and direct the article being passed through the apparatus over the lower knife.

26. An apparatus of the class described comprising a housing including an entrance and an exit, a bracket supporting said housing, a bell mouth removably mounted cooperative with the exit of said housing, scraping elements within said housing, and bell mouth forming members hingedly secured to said housing cooperative with the entrance thereof, and a lifting apron to lift and guide the article being passed through the apparatus into the housing free of the scraping elements.

27. An apparatus of the class described comprising a housing including a rear wall having an exit, an open front and an open bottom, a bracket for supporting said housing, a removable floor supported by said bracket, a bell mouth removably mounted, cooperative with said exit, scraping elements within said housing, and bell mouth forming members hingedly mounted upon said housing cooperative with the open front thereof, and a lifting apron to lift and guide the article being passed through the apparatus into the housing free of the scraping elements.

28. An apparatus of the class described comprising a housing including a rear wall having an exit, an open front and an open bottom, a bracket for supporting said housing, a removable floor supported by said bracket, a bell mouth removably mounted, cooperative with said exit, lower surface scraping elements within said housing, upper surface scraping elements within said housing, bell mouth forming members hingedly mounted upon said housing, an apron pivotally mounted upon said housing cooperative with the open front thereof, and means for raising and lowering the upper scraping elements and the apron.

29. In apparatus of the class described, a housing, scraper elements carried thereby, said housing having a passage therethrough with an entrance and an exit, a sectional bell mouth, and means for swingably mounting said bell mouth sections on the housing.

30. In apparatus of the class described, a housing, scraper elements carried thereby, said housing having a passage therethrough with an entrance and an exit, a sectional bell mouth movably mounted on the housing, and an apron mounted on the bell mouth, and means to raise and lower said apron into and out of engagement with the article being passed through the apparatus.

31. An apparatus of the class described, upper and lower scrapers between which the article to be scraped is passed, scraper supporting means, article lifting means located in advance of the scrapers to lift the article approaching the scrapers over the lower scrapers out of contact therewith, and means to operate said lifting means, substantially as shown and described.

JOHN L. SMITH.